United States Patent
Handerek

(10) Patent No.: US 6,640,043 B2
(45) Date of Patent: Oct. 28, 2003

(54) FIBER FUSE PROTECTION

(75) Inventor: Vincent Handerek, Grays (GB)

(73) Assignee: Nortel Networks Limited, St. Laurent (CA)

( * ) Notice: Subject to any disclaimer, the term of this patent is extended or adjusted under 35 U.S.C. 154(b) by 459 days.

(21) Appl. No.: 09/747,679

(22) Filed: Dec. 22, 2000

(65) Prior Publication Data

US 2002/0114605 A1 Aug. 22, 2002

(51) Int. Cl.[7] ............ G02B 6/00; H04B 10/12; H04B 10/08; H01S 3/30
(52) U.S. Cl. ............ 385/139; 385/27; 385/28; 385/39; 385/42; 385/123; 385/76; 385/77; 385/95; 354/341.1; 372/6; 398/37
(58) Field of Search ............ 385/27, 28, 39, 385/139, 42, 43, 123, 95, 96, 98, 48, 76, 77; 359/333, 341.1, 341.3, 341.43; 398/37; 372/6

(56) References Cited

U.S. PATENT DOCUMENTS

| | | | | |
|---|---|---|---|---|
| 5,013,118 A | * | 5/1991 | Sniadower | 398/144 |
| 5,546,485 A | * | 8/1996 | Darcie | 385/28 |
| 5,659,644 A | * | 8/1997 | DiGiovanni et al. | 385/31 |
| 5,790,735 A | * | 8/1998 | Oleskevich et al. | 385/127 |
| 5,796,861 A | * | 8/1998 | Vogt et al. | 382/128 |
| 6,185,346 B1 | * | 2/2001 | Asawa et al. | 385/28 |
| 6,282,342 B1 | * | 8/2001 | Berkey et al. | 385/43 |
| 6,295,161 B1 | * | 9/2001 | Bazzocchi | 395/341.33 |
| 6,330,382 B1 | * | 12/2001 | Harshbarger et al. | 385/28 |
| 6,477,295 B1 | * | 11/2002 | Lang et al. | 385/31 |
| 6,563,989 B2 | * | 5/2003 | Ishikawa et al. | 385/43 |

OTHER PUBLICATIONS

Maroney et al., U.S. patent application Publication No. U.S. 2002/014608 A1, published Aug. 22, 2002.*
Vakili et al., U.S. patent application Publication No. U.S. 2002/0054740A1, published May 09, 2002.*
Hand, Single–Mode Tapers As 'Fibre Fuse' Damage Circuit–Breakers, Electronic letters, vol. 25, no. 1, Jan. 5, 1989, pp. 33–34.

* cited by examiner

Primary Examiner—Brian Healy
(74) Attorney, Agent, or Firm—Barnes & Thornburg

(57) ABSTRACT

An optical termination element for terminating an optical fiber carrying a signal of first maximum power level comprises a termination fiber which is unable to propagate a fiber fuse when the signal power is below a threshold power level which is greater than the first maximum power level. The termination fiber is designed by selecting values of the core diameter and the higher mode cutoff wavelength. The intention provides a termination component in which a fiber fuse can not be initiated at the maximum power to be provided to the termination.

13 Claims, 3 Drawing Sheets

FIBER FUSE PROTECTION

FIELD OF THE INVENTION

The present invention relates to the phenomenon known as a fiber fuse and in particular method of designing components to prevent the initiation of a fiber fuse, particularly at fiber terminations.

BACKGROUND OF THE INVENTION

Optical power levels in optical transmission systems are generally increasing. This is due to a number of factors.

For instance, optical transmission systems, including optical fibers and other optical devices such as polarisation mode dispersion compensation mechanisms and photonic switches, all have attenuation characteristics. Increasing the power of an optical signal provides a better signal to background noise ratio, and allows the signal to be transmitted longer distances over the optical transmission system before optical amplification is required. Advances in laser technology have ensured that higher powered lasers are now more readily and cheaply available, thus allowing a cost effective implementation of high optical power signal generation.

Typical optical transmission systems simultaneously transmit data using a multitude of different wavelengths, each transmission channel having a separate wavelength of light for transmission of the respective optical signal. Increasingly, channels are becoming more closely packed together with regard to wavelength e.g. DWDM (Dense Wavelength Division Multiplexed) systems. Increasing the number of simultaneous optical transmissions at different wavelengths will increase the average optical power being carried by the transmission system.

Many optical systems utilise optical amplifiers comprising optical fiber. An example of this is a Raman amplifier i.e. an amplifier that utilises the Raman effect. Optical amplifiers of this type normally use relatively high power pump lasers for providing the optical power that is utilised to amplify the optical signal power. Current trends indicate it is increasingly likely that Raman amplifiers will be utilised in future telecommunications systems.

Experiments have indicated that high optical powers propagating through fibers can induce an effect referred to as a "fiber fuse". The fiber fuse effect, also termed self-propelled self-focusing (SPSF), is a catastrophic damage mechanism. *Electronics letters, Jan.* 7, 1988, Vol. 24, No. 1, pages 47–48 by R Kashyap & K J Blow and *Electronics letters* Jan. 5, 1989, Vol. 25, No. 1, Pages 33–34 by D P Hand & T A Birks describe this phenomena in some detail and describe a fiber fuse damage circuit-breaker, and are incorporated herein by reference.

The fiber fuse effect is believed to be initiated by local heating of the fiber. This can lead to a runway thermal effect which, provided the laser power is sufficient, continues until the fiber core melts. A thermal shock wave is created (visible as a bright spot of side-scattered light) that propagates back along the fiber towards the optical power source. This results in the fiber being permanently damaged and unable to guide light.

Propagation velocity is believed to be of the order of tens of meters per second. A fiber fuse occurring in a telecommunications system could be extremely damaging. The side-scattered light could also be dangerous to any onlookers. Additionally, in systems where optical fiber spans (i.e. typically the length between optical fiber amplifiers) are of the order of 80 kilometres, it will be appreciated that if the fiber fuse is not contained, it has the capacity to damage large lengths of optical fiber. This would require replacement of the damaged fiber. If the fiber fuse is able to propagate into optical processing equipment, such as an amplifier or pump laser, the fiber fuse can result in damage to very expensive network components.

It is therefore desirable to limit the damage caused by fiber fuses or to prevent initiation of a fiber fuse. As mentioned above, it has been proposed that the initiation of a fiber fuse results from local heating of the fiber. How this local heating is initiated has not been fully understood, although it has been recognised that a fiber fuse may be initiated at the site of fiber damage, such as a fiber break.

The fiber fuse effect is also discussed in the assignee's copending U.S. patent application Ser. No. 09/544,362, filed Apr. 6, 2000 entitled "Fiber Fuse Protection" which is incorporated herein by way of reference material.

The invention stems from the recognition that fiber terminations provide one location where the initiation of a fiber fuse is more likely than at other locations. It has also been recognised that a beam expander can be used to halt the propagation of the fiber fuse, as described in the article of *Electronics letters* Jan. 5, 1989, reference more fully above.

However, until now, there has not been a detailed analysis of the conditions under which a fiber fuse will be initiated, nor the conditions which permit the propagation of the fiber fuse to be arrested. There is a need for an understanding of these conditions to enable optimum components to be designed which can halt the fiber fuse travel or which can prevent the fuse starting.

This invention concerns specifically fiber terminations. As one example, these are used in optical transmission systems as a so-called "beam dump" for unabsorbed pump light in an amplifier. Thus, pump light injected into an amplifier which is not absorbed by the amplifier fiber core passes beyond the amplifier, and must be "dumped" to prevent interference outside the amplifier. This is achieved by providing wavelength-dependent routing to the "beam dump", which may for example comprise a copper absorber. The pump powers used in amplifiers can be significant, particularly when the Raman amplification effect is being used. Therefore, significant heating can occur at the beam dump, which is one possible cause of the initiation of a fiber fuse.

Other components provide termination of a fiber, for example where signals on two fibers are to be combined, in couplers, combiners or tap devices. In each case, the termination can provide an increased risk of a fiber fuse being generated.

SUMMARY OF THE INVENTION

The invention is based on the realisation that a fiber fuse can only be initiated within a fiber when the fiber is carrying power greater than a threshold power. This threshold power is a function of the fiber characteristics, and this understanding enables components for preventing fiber fuse initiation to be designed, by ensuring that they have a higher power threshold.

In a first aspect, the present invention provides an optical termination element for terminating an optical fiber carrying a signal of first maximum power level, comprising a termination fiber which is unable to propagate a fiber fuse when the power is below a threshold power level which is greater than the first maximum power level, the values of the core diameter and the higher mode cutoff wavelength of the termination fiber defining the threshold power level.

The invention provides a termination component which has a threshold power level (below which a fiber fuse can not be started) which exceeds the maximum power to be provided to the termination. A fiber fuse can not therefore be started. The invention is based on the recognition that there is such a threshold power and that the value of the threshold power is a function of the core diameter and the higher mode cutoff wavelength of a fiber. For large core diameters, an increase in core diameter increases the threshold power. This is considered to result from reduced "thermal leasing". This is one phenomenon which can be used to explain the propagation of the thermal fuse, and is based on the idea that a local fuse location is imaged to a focal point within the core at an adjacent location, at which a fuse is created. Increasing the core diameter, and therefore the mode field diameter, increases the size of these focal points and thereby reduces the intensity. For small core diameters, it is believed that heat dissipates more readily to the cladding, so that as the core diameter is reduced, the threshold also increases. Thus, the threshold power has a minimum value with respect to core diameter (for a fiber of constant cutoff wavelength).

The optical fiber to be terminated preferably comprises single mode fiber and the termination fiber comprises multimode fiber, for example a silica rod having an outer diameter corresponding to the outer diameter of the cladding of the fiber to be terminated. The multimode fiber causes the light emerging from the single mode core to diffract to larger spot sizes while being fully enclosed in the termination fiber. This removes the location of any potential heat generation from the single mode core.

In accordance with a second aspect of the invention, there is provided an optical element for processing optical signals, comprising an optical fiber to be terminated carrying a signal of first maximum power level and an optical termination element for terminating the optical fiber, the termination element comprising a termination fiber which is unable to propagate a fiber fuse when the power is below a threshold power level which is greater than the first maximum power level, the values of the core diameter and the higher mode cutoff wavelength of the termination fiber defining the threshold power level.

This optical element thus uses a termination element of the invention. The optical element may comprise a coupler, combiner, beam dump or tap device.

The invention is particularly suitable for use in amplifier designs, in which there is unused high power pump light to be "dumped". Therefore, in accordance with a third aspect of the invention, there is provided an optical amplifier compressing amplification fiber and a pump source, a first coupler being provided for routing signals from the pump source to a first end of the amplification fiber and a second coupler being provided for routing pump source signals from a second end of the amplification fiber to a termination element using a first fiber, wherein the termination element comprises a termination fiber which is unable to propagate a fiber fuse when the power is below a threshold power level which is greater than the maximum pump source power level routed to the termination element, the values of the core diameter and the higher mode cutoff wavelength of the termination fiber defining the threshold power level.

The amplification fiber may comprise rare earth doped fiber or transmission fiber. In the latter case amplification is by means of the Raman effect.

In accordance with a fourth aspect of the invention there is provided a fiber laser comprising amplification fiber and a pump source, a first coupler being provided for routing signals from the pump source to the amplification fiber and reflectors being provided at the ends of the amplification fiber, a termination element being provided for terminating unused pump power which comprises a termination fiber which is unable to propagate a fiber fuse when the power is below a threshold power level which is greater than the maximum power routed to the termination element, the values of the core diameter and the higher mode cutoff wavelength of the termination fiber defining the threshold power level.

The invention also provided a method of designing an optical termination element for terminating an optical fiber carrying a signal of first maximum power level, comprising:

selecting a threshold power level which is greater than the first maximum power level; and selecting a termination fiber which is unable to propagate a fiber fuse when the signal power is below the threshold power level, by selecting values of the core diameter and the higher mode cutoff wavelength.

BRIEF DESCRIPTION OF DRAWINGS

Examples of the invention will now be described in detail with reference to the accompanying drawings, in which.

DETAILED DESCRIPTION OF PREFERRED EMBODIMENTS

The invention is based on prolonged studies of the fiber fuse effect, and some significant findings of these studies will first be given, to enable the invention to be understood more fully.

Figure 1:
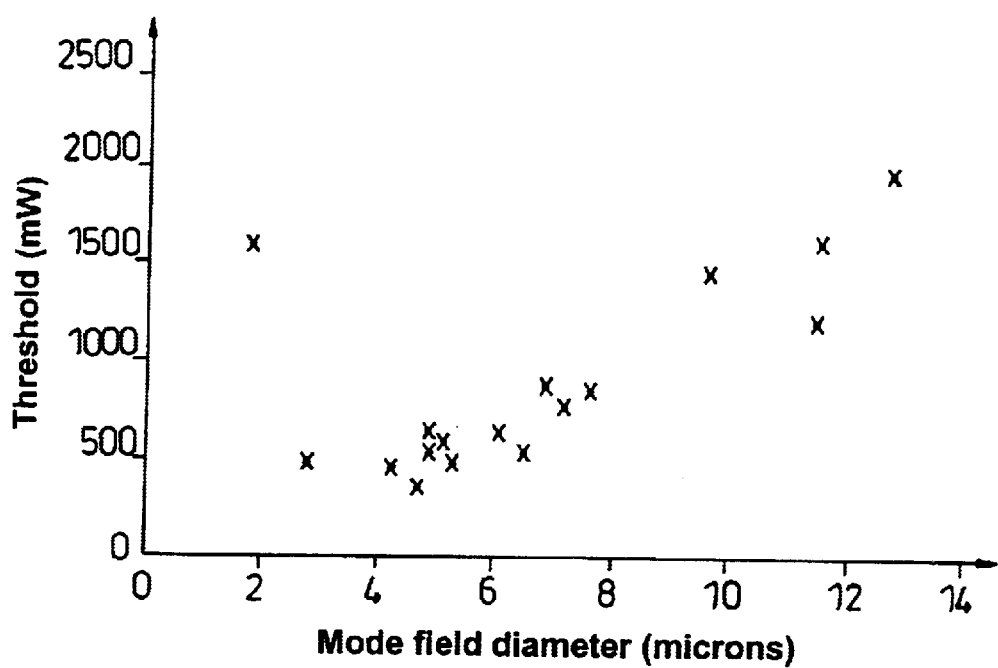
FIG. 1 shows experimental results which show the minimum signal powers at which a fiber fuse can be initiated for different fibers.

FIG. 1 shows experimental results which show the minimum signal powers which were carried by different optical fibers when a fiber fuse could be initiated. Different techniques were employed to trigger the fiber fuse, for example including exposing broken or cleaved fiber ends to heat absorbers (thereby promoting localised heating).

FIG. 1 plots the fiber mode field diameter against the minimum power at which a fuse can be initiated, hereinafter referred to as the "threshold power". The results shown in FIG. 1 are based on experimentation and suggest that there is a linear dependence of the threshold power on the mode field diameter (MFD) of the radiation within the fiber for an MFD greater than 4 microns. Also, there is an absolute minimum power required for fuse behaviour, below which even the most susceptible fiber does not exhibit the effect. This is close to 375 mW. This minimum power seems to be required in order to create an area of local absorption within the fiber via heating to the point of thermal runaway. At very small MFD the threshold rises again, possibly because the small core sizes involved make generating thermal effect more difficult.

It has also been found, by separate experimentation, that the fuse triggering threshold is also the threshold at which the fuse will terminate as the power is gradually reduced. Additionally the likelihood of triggering a fuse depends strongly on the extra power above threshold in the fiber, and spontaneous fuses can be generated from poor quality cleaves at high enough powers.

FIG. 1 shows that above an MFD of four microns the fuse threshold varies approximately linearly with MFD. This allows prediction of the fuse power thresholds for most fibers. An empirical model was developed to predict the fuse threshold power $P_{th}$ of a fiber given its higher mode cut-off wavelength, core diameter and the operating wavelength. Within the region displaying the linear trend with MFD, the fuse threshold is approximated by equation (1):

$$P_{th} = \phi\left(\frac{\varphi}{\varphi_c}\right)(105 + 5.869\phi) \, mW \tag{1}$$

where $\Phi$ is the core diameter in microns and $\Phi$ and $\Phi_c$ are the mode field diameters respectively at the operating wavelength $\lambda$ and at the higher mode cutoff wavelength, $\lambda_c$. The mode field diameter can be approximated (in known manner) by:

$$\varphi = \phi\left(0.65 + 3.894\left(\frac{\lambda_c}{\lambda}\right)^{\frac{3}{2}} + 6.924\left(\frac{\lambda_c}{\lambda}\right)^{-6}\right) \tag{2}$$

The mode field diameter is thus a function of the core diameter and the cutoff wavelength. Likewise, the threshold power is also a function of the core diameter and cutoff wavelength in the linear region.

Equation (1) suggest that the fuse threshold scales approximately linearly with core diameter, with a correction factor related to the variation of mode field diameter with normalised frequency. The predicted fuse threshold has been found to be accurate for all quasi-step index fibers tested, provided that they remain single mode. The formula is not accurate for other fiber designs.

At small mode field diameters, the model uses equation (3) below. As the MFD approaches zero, the threshold intensity suggested by the model approaches the intrinsic damage threshold of silica.

$$P_{th} = 7.59 \times 10^3 e^{-1.07\Phi} \, mW \tag{3}$$

In the low MFD region, the threshold power is again a function of the core diameter and cutoff wavelength. Thus, the threshold power for all mode field diameter values is a function of the core diameter and cutoff wavelength.

Figure 2:
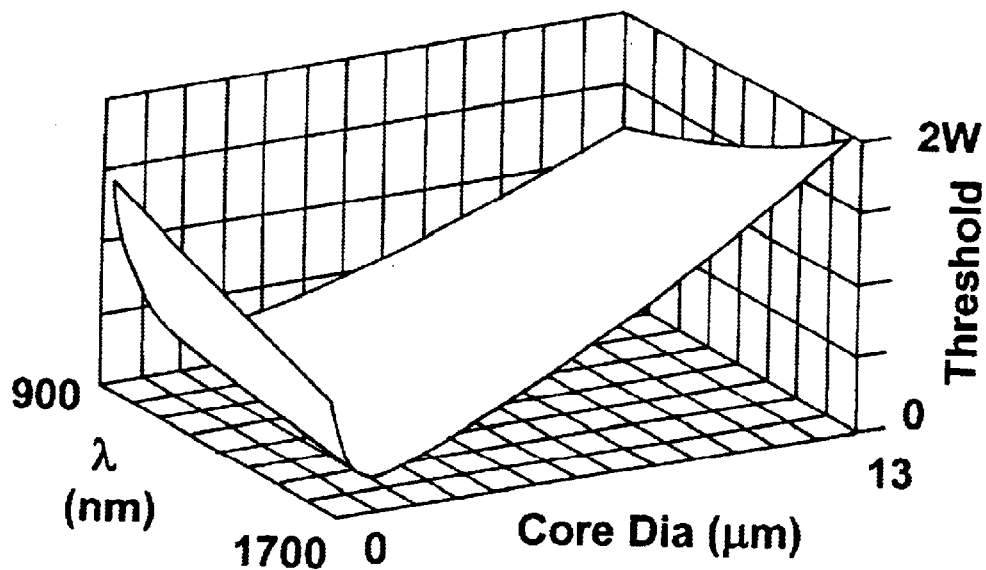
FIG. 2 shows an example of threshold variation with wavelength and core diameter for a given higher mode cut-off wavelength.

FIG. 2 shows an example of threshold variation with wavelength and core diameter for a given higher mode cut-off wavelength, suing both expressions (1) and (3). The fiber fuse threshold is a function of the wavelength of the signals transmitted in the fiber, and the threshold power is the power of signals at that wavelength below which a fiber fuse can not be initiated.

The ability to predict the fiber fuse threshold with a knowledge of the basic characteristics of a fiber enables protection devices to be designed using fibers which demonstrate increased fiber fuse threshold, and which therefore can ensure that a fiber fuse does not initiate in that fiber. This fiber can then be positioned at locations within a network where a fiber fuse may otherwise be generated.

Figure 3:
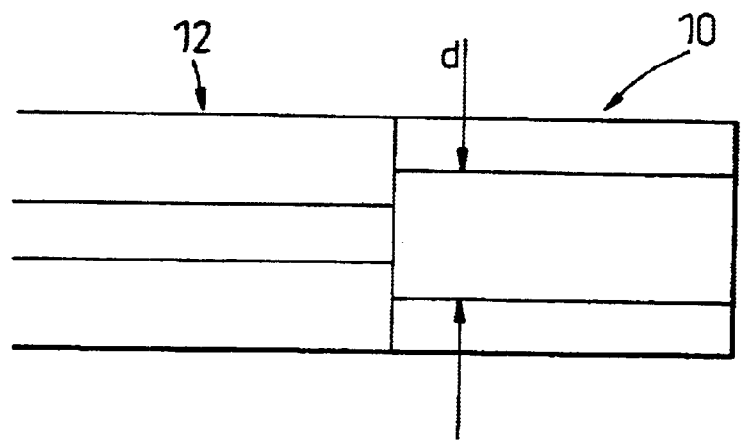
FIG. 3 shows an optical termination element of the invention.

FIG. 3 shows an optical termination element 10 which comprises a fiber of different design to the fiber 12 being terminated. The two fibers 10, 12 are spliced together. The fiber 12 being terminated carries a signal of first maximum power level. This signal may comprise a number of WDM channels in a optical communications network, or it may comprise a pump source signal. The termination element comprises a termination fiber 10 which is unable to propagate a fiber fuse when the signal power is below a threshold power level. This threshold power level is greater than the maximum power level in the fiber 12. The termination fiber is designed by selecting values of the core diameter (d) and the higher mode cutoff wavelength, in order to achieve the desired power threshold using the equations above.

Typically, the optical fiber to be terminated 12 comprises single mode fiber, whereas the termination fiber 10 comprises multimode fiber. The multimode fiber causes the light emerging from the single mode core to diffract to larger spot sizes while being fully enclosed in the termination fiber. This removes the location of any potential heat generation from the single mode core. The multimode fiber may comprise a silica rod of diameter corresponding to the outer diameter of the cladding.

Figure 4:
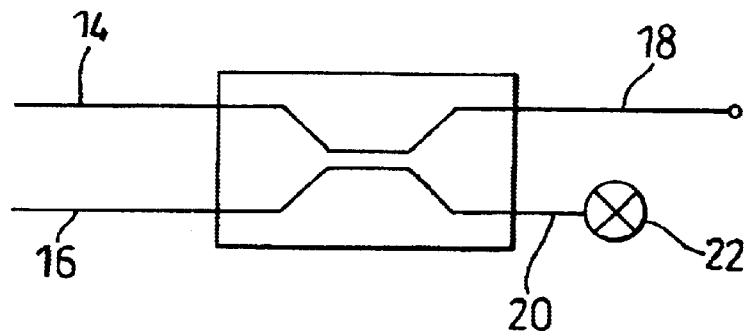
FIG. 4 shows a 2×2 optical coupler using a termination element of the invention.

The termination element can be used in any optical processing device where a fiber is to be terminated. For example, it may be used in an optical coupler, combiner, beam dump or tap device. FIG. 4 shows a 2×2 optical coupler in which signals on two inputs 14, 16 are combined onto a single output 18, and a second output 20 is terminated at 22.

Figure 5:
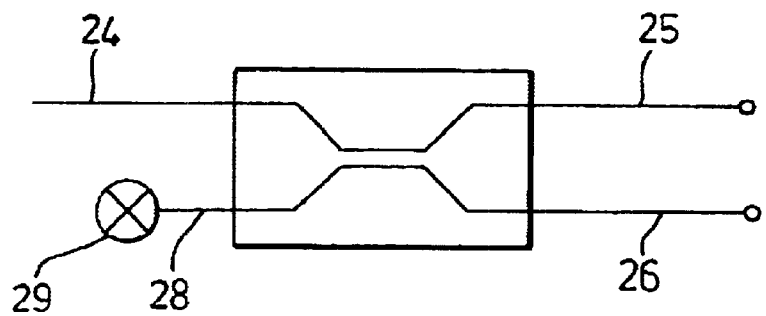
FIG. 5 shows a tap device using a termination element of the invention.

FIG. 5 shows a tap device similar to the 2×2 optical coupler, in which the signal on one input 24 is provided to one output 25 and a tap signal is provided to a second output 26. A second input 28 is terminated at 29.

Figure 6:
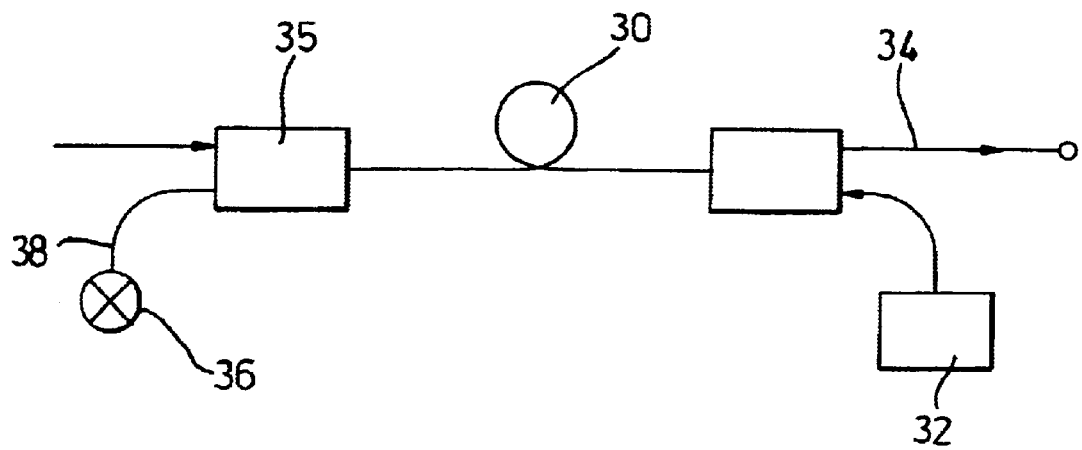
FIG. 6 shows an optical amplifier using a termination element of the invention.

The invention is particularly useful in optical amplifiers, in which high power pump light is generated, and may be unused, therefore needing to be "dumped". FIG. 6 shows an optical amplifier comprising amplification fiber 30 and a pump source 32. A first coupler 34 is provided for routing signals from the pump source 32 to a first end of the amplification fiber 30 and a second coupler 35 is provided for routing pump source signals from a second end of the amplification fiber 30 to a termination element 36 using a first fiber 38. The termination element is designed as set out above, and comprises a termination fiber which is unable to propagate a fiber fuse when the signal power is below a threshold power level which is greater than the maximum unabsorbed pump source power in the fiber 38.

The fiber 38 comprises single mode fiber and the termination fiber comprises multimode fiber. Alternatively, the termination fiber may simply have a larger mode field diameter than the fiber 38 in order to provide the required increase in threshold level.

In the example of FIG. 6, the amplification fiber 30 comprises rare earth doped fiber, such as Erbium doped fiber. In this case the pump source may typically be a 980 mm or 1480 nm pump source. Various amplifier configurations will be well known to those skilled in the art, with co- and/or computer-pumping. Furthermore, those skilled in the art will appreciate that other components are used, such as isolators, and that a simplified examples are given in this text for ease of explanation. In all cases, the invention may be used for terminating fibers.

Raman amplification is also being used to increase the reach of optical spans within networks. This amplification process uses transmission fiber with distributed pump sources, which are higher power than in rare earth doped amplifiers. The termination of the invention is particularly suited to the termination of fibers carrying unused Raman pump light. The amplifier layout is the same as in FIG. 5, but the amplifier fiber 30 comprises undoped transmission fiber, and the pump source 32 is a high power Raman pump source.

Figure 7:
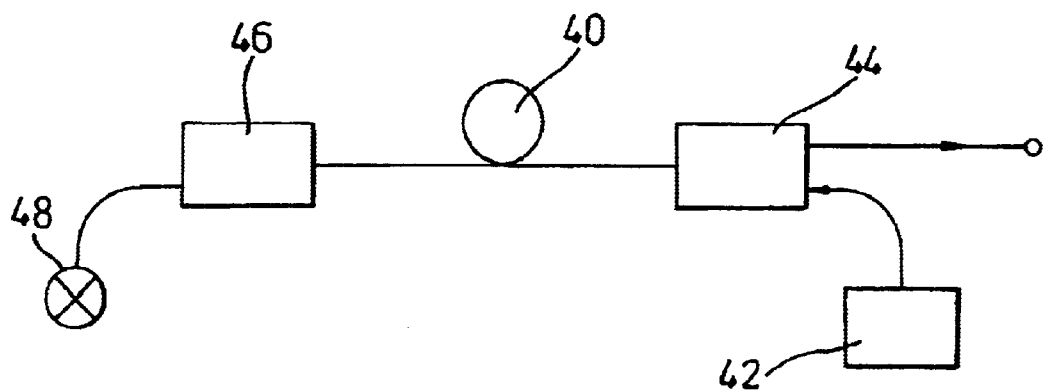
FIG. 7 shows a fiber laser using a termination element of the invention.

The invention can also be applied to fiber lasers. FIG. 7 shows a fiber laser comprising amplification fiber 40 and a pump source 42. A first coupler/reflector 44 is provided for routing signals from the pump source 42 to the amplification fiber 40. Reflectors 44, 46 are provided at the ends of the amplification fiber and a termination element 48 is provided for terminating unused pump power. The reflector 46 may be a wavelength dependent reflector to allow the unused pump light to escape to the terminator, while reflecting the amplified signal. Reflector 44 may be a partial reflector to allow some laser light to pass through.

In all cases, the termination fiber is designed by selecting a threshold power level which is greater than the maximum power level in the fiber to be terminated. The termination fiber is designed such that it is unable to propagate a fiber fuse when the signal power is below the threshold power level. The termination fiber is designed by selecting values of the core diameter and the higher mode cutoff wavelength.

What is claimed is:

1. An optical termination element for terminating an optical fiber carrying a signal of first maximum power level, comprising a termination fiber which is unable to propagate a fiber fuse when the signal power is below a threshold power level which is greater than the first maximum power level, the values of the core diameter and the higher mode cutoff wavelength of the termination fiber defining the threshold power level.

2. An optical termination element according to claim 1, wherein the optical fiber to be terminated comprises single mode fiber.

3. An optical termination element according to claim 2, wherein the termination fiber comprises multimode fiber.

4. An optical termination element according to claim 1, wherein the termination fiber comprises a silica rod.

5. An optical element for processing optical signals, comprising an optical fiber to be terminated carrying a signal of first maximum power level and an optical termination element for terminating the optical fiber, the termination element comprising a termination fiber which is unable to propagate a fiber fuse when the power is below a threshold power level which is greater than the first maximum power level, the values of the core diameter and the higher mode cutoff wavelength of the termination fiber defining the threshold power level.

6. An optical element according to claim 5, comprising a coupler, combiner, beam dump or tap device.

7. An optical amplifier comprising amplification fiber and a pump source, a first coupler being provided for routing signals from the pump source to a first end of the amplification fiber and a second coupler being provided for routing pump source signals from a second end of the amplification fiber to a termination element using a first fiber, wherein the termination element comprises a termination fiber which is unable to propagate a fiber fuse when the power is below a threshold power level which is greater than the maximum pump source power level routed to the termination element, the values of the core diameter and the higher mode cutoff wavelength of the termination fiber defining the threshold power level.

8. An amplifier according to claim 7, wherein the first fiber comprises single mode fiber and the termination fiber comprises multimode fiber.

9. An amplifier according to claim 7, wherein the termination fiber has larger mode field diameter than the first fiber.

10. An amplifier according to claim 7, wherein the amplification fiber comprises rare earth doped fiber.

11. An amplifier according to claim 7, wherein the amplification fiber comprises transmission fiber, and wherein amplification is by means of the Raman effect.

12. A fiber laser comprising amplification fiber and a pump source, a first coupler being provided for routing signals from the pump source to the amplification fiber and reflectors being provided at the ends of the amplification fiber, a termination element being provided for terminating unused pump power which comprises a termination fiber which is unable to propagate a fiber fuse when the power is below a threshold power level which is greater than the maximum power routed to the termination element, the values of the core diameter and the higher mode cutoff wavelength of the termination fiber defining the threshold power level.

13. A method of designing an optical termination element for terminating an optical fiber carrying a signal of first maximum power level, comprising:

selecting a threshold power level which is greater than the first maximum power level; and selecting a termination fiber which is unable to propagate a fiber fuse when the signal power is below the threshold power level, by selecting values of the core diameter and the higher mode cutoff wavelength.

* * * * *